April 2, 1957 W. L. STADLER 2,787,196
VALVE RESEATER
Filed Sept. 11, 1952
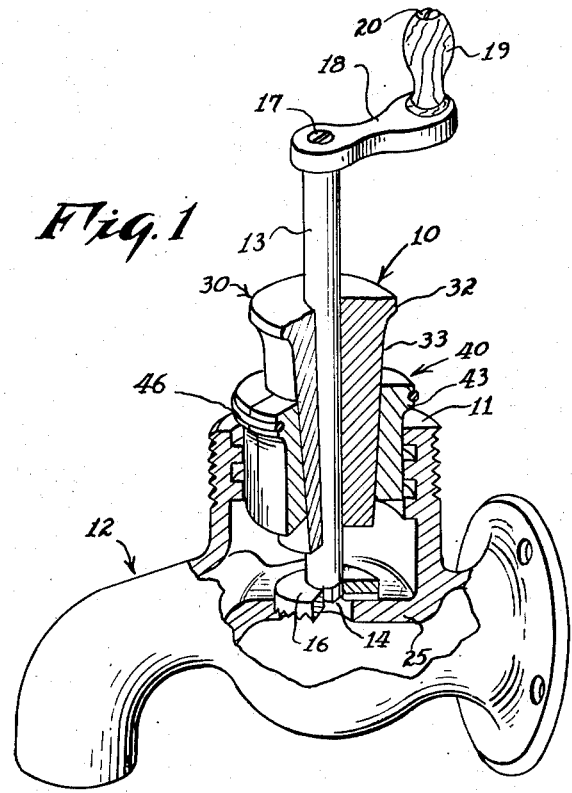
Fig. 1
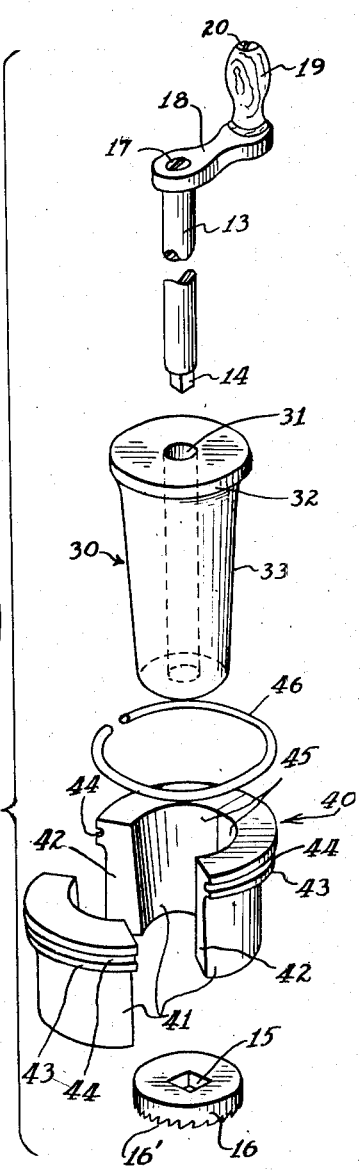
Fig. 2
Fig. 3
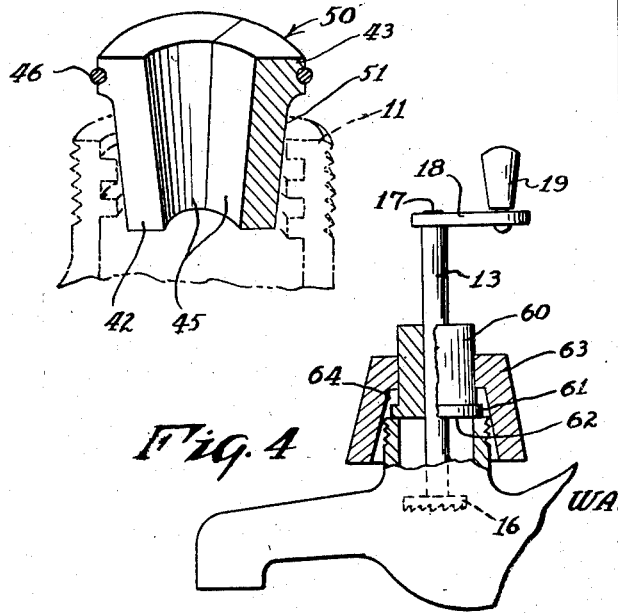
Fig. 4
INVENTOR.
WALTER L. STADLER
BY
L. S. Saulsbury
ATTORNEY

United States Patent Office 2,787,196
Patented Apr. 2, 1957

2,787,196

VALVE RESEATER

Walter L. Stadler, Ramsey, N. J.

Application September 11, 1952, Serial No. 308,978

1 Claim. (Cl. 90—12.5)

This invention relates to valve reseating devices, and more particularly to valve reseating devices for use on household faucets, etc.

The particular embodiment of the present invention, which is illustrated in the drawings and which will be described hereinafter in greater detail, comprises generally a hand actuable cutter shaft, a shaft guide slidably supporting the cutter shaft, and a bushing for supporting the guide in a valve bonnet above the valve seat.

It is a primary object of the present invention to provide a valve reseater which may be used by an unskilled operator.

Another object of the present invention is to provide a valve reseater which may be used for valves of various proportions.

Still another object of the present invention is to provide a valve reseater which is self-adjusting when used with valves of various proportions.

Yet another object of the present invention is to provide a valve reseater which requires no extraordinary skill to produce highly accurate work.

A further object of the present invention is to provide a valve reseater which will produce highly accurate work on valves of various proportions.

Still a further object of the present invention is to provide in a valve reseater of the type described a highly improved supporting bushing.

Yet another object of the present invention is to provide a valve reseater which is simple and durable, inexpensive to manufacture and sell and effective for its intended purpose.

For other objects and for a better understanding of the invention, reference may be had to the following detailed description taken in connection with the accompanying drawing in which:

Figure 1 is a perspective view, partly in section, of a device constructed in accordance with the present invention as attached to a valve;

Fig. 2 is an exploded view of the device shown in Fig. 1;

Fig. 3 is a perspective view, partly in section, of a slightly modified supporting bushing, a valve bonnet being shown in dotted outline;

Fig. 4 is a side elevational view, partly in section, of a slightly modified form of the invention.

Referring now more particularly to the drawings, in which corresponding reference numerals represent corresponding parts in each of the several views, the embodiment of the invention illustrated therein comprises a valve reseater, generally designated at 10, which is shown in Fig. 1, in operative position in the bonnet 11 of valve 12.

The reseater 10 includes a vertically disposed shaft 13 which is formed on one end with a longitudinal extension 14 for reception in the opening 15 of cutter 16. The cutter is preferably disc shaped and formed on its lower face with a plurality of radial serrations 16' which serve as cutting edges.

On the upper end of shaft 13 is a transverse crank 18 having one end fixedly secured to the shaft by screw 17. Rotatably mounted on the other end of crank 18 is a hand actuatable knob 19 which is secured by the fastener 20. Thus, it is seen that cranking movement imparted to the knob 19 effects rotative movement of the cutter 16, and if the cutter is properly positioned against the valve seat 25, the seat will be accurately and efficiently ground.

Slidably surrounding the shaft 13 is a shaft guide 30, which is formed of a block of wear resistant material, having a longitudinal bore or aperture 31 extending centrally therethrough for slidably and rotatably supporting the shaft 13. The shaft guide is provided with a laterally extending peripheral flange 32 adjacent its upper end and a tapered surface 33 extending from the flange to the lower end of the guide.

The shaft guide is conformably received in and supported by a bushing which is generally designated at 40. The bushing includes at least three circumferential segments 41 which combine to form a cylinder when the end faces 42 of the segments are in abutting relation with respect to each other. Adjacent the upper end of each segment 41 is a laterally outwardly extending flange 43, each of which is provided with a co-extensive peripheral groove 44. The grooves 44 are arranged to be in end to end alignment with respect to each other when the segments 41 are in abutting relation with respect to each other. The interior surfaces 45 of the circumferential segments 41 are shaped to taper downwardly for conformably engaging the surface 33 of the shaft guide 30. Disposed in the grooves 44 about the periphery of flanges 43 is an open annular member or ring 46. The open rings may be fabricated of resilient metal or plastic, or may be a closed annular member of rubber or other elastic material.

Thus, it is seen that the bushing 40 is radially expandable for holding the shaft guide 30 at any selected position therealong and for snug insertion into valve bonnets of various diameters. Also, for valves of different bonnet depths, the guide 30 may be shifted longitudinally to assure adequate support adjacent the cutter end of shaft 13 to prevent tilting of the shaft and gouging the valve seat. As the segments 41 are resiliently held about the guide 30, it is seen that the bushing, guide and shaft assembly may be inserted together into the valve bonnet and the bushing will adjust itself to the bonnet and allow the guide to be supported in the proper relation with respect to the valve seat.

In Fig. 3 is shown a slightly modified form of segmental bushing 50, wherein the external surface 51 is formed with a taper extending from the flange 43 to the lower end of the bushing. This provides for a wider range of adjustment, that is the range of bonnet diameters to which the bushing will adjust, is increased.

Another slightly modified form of valve reseater is shown in Fig. 4 wherein the shaft guide 60 is cylindrical in shape and provided with a peripheral flange 61 which is flush with the lower end wall 62 of the guide. The flange 61 is adapted to rest upon the upper end of the valve bonnet 11 for properly positioning the shaft 13 and cutter 16. A cup-shaped member 63 is provided with a central aperture for slidably receiving the guide 60. The cup is inverted and provided with an internally tapered surface 64 which is adapted to engage valve bonnets of various sized diameters. Thus, it is seen that the cup 63 will accurately locate the shaft 13 and guide 60. This form of the invention is particularly adapted for small bonnet valves, as neither the bushing nor the shaft guide are disposed within the bonnet.

Although the present invention has been described in some detail by way of illustration and example for purposes of clarity of understanding, it is understood that certain changes and modifications may be made within the spirit and scope of the appended claim:

What is claimed is:

A valve reseater assembly comprising an expandable bushing adapted to be inserted in different sized bonnet openings of faucets, said expandable bushing being formed of a plurlity of circumferentially expandable arcuate segments and providing a smooth tapered central opening and a smooth cylindrical exterior surface adapted for engagement with the bonnet openings, an outwardly-extending flange on the upper end of each segment with a groove running coextensively therewith in the outer periphery thereof, said flanges and the groove of the segments being removed from the cylindrical exterior surface of the bushing segments and cooperating with the one another, a resilient retaining ring lying in the grooves on the flanges and surrounding the segments to normally hold the same together in circumferential relationship, an externally tapered shaft sleeve guide adapted to be slide-fitted into the tapered central opening of the expandible bushing so as to expand the segments and to secure the reseater assembly within the faucet bonnet opening, an operating shaft slidable and rotatably operable in said shaft sleeve guide, a cutting disc attached to the lower end of the operating shaft and an operating arm on the upper end of the operating shaft by which the shaft with the cutting disc may be rotated.

References Cited in the file of this patent

UNITED STATES PATENTS

| | | |
|---|---|---|
| 692,459 | Langlois | Feb. 4, 1902 |
| 1,061,694 | Skinner | May 13, 1913 |
| 1,425,611 | Skinner | Aug. 15, 1922 |
| 1,731,032 | Troha | Oct. 8, 1929 |
| 2,018,554 | Hawker | Oct. 22, 1935 |
| 2,556,229 | Stanfield | June 12, 1951 |
| 2,573,790 | Herzog | Nov. 6, 1951 |

FOREIGN PATENTS

| | | |
|---|---|---|
| 35,283 | Austria | Nov. 25, 1908 |
| 266,008 | Germany | Oct. 17, 1913 |
| 537,262 | France | May 19, 1922 |